(12) United States Patent
Attig

(10) Patent No.: US 8,625,438 B1
(45) Date of Patent: Jan. 7, 2014

(54) CIRCUIT AND METHOD FOR EXTRACTING FIELDS FROM PACKETS

(75) Inventor: Michael E. Attig, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 315 days.

(21) Appl. No.: 13/229,083

(22) Filed: Sep. 9, 2011

(51) Int. Cl.
*H04L 12/26* (2006.01)

(52) U.S. Cl.
USPC .......................................... 370/241; 370/474

(58) Field of Classification Search
USPC .................. 370/241, 474; 709/230, 235, 245; 327/407
See application file for complete search history.

(56) References Cited

U.S. PATENT DOCUMENTS 5,754,525 A * 5/1998 Lo et al. ........................ 370/389

OTHER PUBLICATIONS

U.S. Appl. No. 12/858,416, filed Aug. 17, 2010, Attig et al.
U.S. Appl. No. 12/858,418, filed Aug. 17, 2010, Attig et al.
U.S. Appl. No. 12/858,421, filed Aug. 17, 2010, Attig et al.

* cited by examiner

*Primary Examiner* — Yemane Mesfin
*Assistant Examiner* — Jeff Banthrongsack
(74) *Attorney, Agent, or Firm* — LeRoy D. Maunu

(57) ABSTRACT

Approaches for selecting a field of data from a packet of data in an n-bit data path. A first selector circuit has m inputs and an output. The m inputs receive respective overlapping subsets of bits of the data path. The first selector selects one of the subsets of bits. Each stage of two or more shift-and-select stages includes a respective second selector circuit having up to m inputs. One of the inputs of the respective second selector circuit inputs an un-shifted version of the subset of bits, one or more others of the up to m inputs of the respective second selector circuit input different shifted versions of the subset of bits, and the respective second selector circuit outputs a selected one of the un-shifted or shifted versions of the subset of bits. The last shift-and-select stage outputs the field of data aligned to the least significant bit.

20 Claims, 5 Drawing Sheets

CIRCUIT AND METHOD FOR EXTRACTING FIELDS FROM PACKETS

FIELD OF THE INVENTION

One or more embodiments of the invention generally relate to communication protocols, and more particularly to packet processors for manipulating data packets.

BACKGROUND

A network packet processor may input a stream of network packets, manipulate the contents of the network packets, and output another stream of modified network packets. The manipulations may implement a protocol for processing network packets. For example, the network packet processor may implement a protocol layer of a communication protocol, and for a high-level packet received from a higher protocol layer and delivered to a lower protocol layer for eventual transmission on the communication media, the manipulations may encapsulate the high-level packet within a low-level packet of the lower protocol layer.

Packet parsing involves processing packets to determine where protocol boundaries and protocol layers reside within packets. In order to make decisions about the next protocol layer to inspect, packet fields within the packets are examined. Each protocol layer may require the inspection of multiple fields within the protocol layer of the packet to assist in making parsing decisions.

High-speed packet parsing may entail streaming data transmission with wide data paths, such as 1024 or 2048 bits or more. Packet parsing requires flexibility in order to accommodate different protocols and hence different packet formats. Thus, the rules that specify how to process the protocol layers should be configurable. It is desirable that the configurability be both fast and interchangeable after a system has been implemented and deployed.

The present invention may address one or more of the above issues.

SUMMARY

One or more embodiments provide circuits and methods for selecting a field of data from a packet of data in an n-bit data path. In one embodiment, a first selector circuit has m inputs and an output. Each of the m inputs receives a respective subset of bits of the data path. The respective subset of bits input to each of the m inputs overlaps with the respective subset of bits of the data path input to another of the m inputs. The first selector circuit selects one of the subsets of bits for the output. Each shift-and-select stage of two or more shift-and-select stages, includes a respective second selector circuit that has up to m inputs and an output. The inputs of an initial one of the shift-and-select stages is coupled to the output of the first selector circuit, and the respective second selector circuit in each other of the two or more shift-and-select stages is coupled to the output of the respective second selector circuit in a preceding one of the shift-and-select stages. One of the inputs of the respective second selector circuit inputs an un-shifted version of the subset of bits, one or more others of the up to m inputs of the respective second selector circuit input different shifted versions of the subset of bits, and the respective second selector circuit outputs a selected one of the un-shifted or shifted versions of the subset of bits. The respective second selector circuit in a last one of the shift-and-select stages outputs one of the un-shifted or shifted versions of the subset of bits that includes the field of data aligned to the least significant bit.

In another embodiment, a plurality of field extractor circuits is configured and arranged for parallel input of bits of an n-bit data path. Each field extractor circuit includes, respectively, a first selector circuit and two or more shift-and-select stages. The first selector circuit has m inputs and an output. Each of the m inputs receives a respective subset of bits of the data path. The respective subset of bits input to each of the m inputs overlaps with the respective subset of bits of the data path input to another of the m inputs, and the first selector circuit selects one of the subsets of bits for the output. Each shift-and-select stage includes a respective second selector circuit that has up to m inputs and an output. The inputs of an initial one of the shift-and-select stages are coupled to the output of the first selector circuit, and the respective second selector circuit in each other of the two or more shift-and-select stages is coupled to the output of the respective second selector circuit in a preceding one of the shift-and-select stages. One of the inputs of the respective second selector circuit inputs an un-shifted version of the subset of bits, one or more others of the up to m inputs of the respective second selector circuit input different shifted versions of the subset of bits, and the respective second selector circuit outputs a selected one of the un-shifted or shifted versions of the subset of bits. The respective second selector circuit in a last one of the shift-and-select stages outputs one of the un-shifted or shifted versions of the subset of bits that includes the field of data aligned to the least significant bit.

A method for selecting a field of data from a packet of data in an n-bit data path is provided in another embodiment. The method includes inputting a respective subset of bits of the data path to each of m inputs of a first selector circuit. The respective subset of bits input to each of the m inputs overlaps with the respective subset of bits of the data path input to another of the m inputs. One of the subsets of bits is selected for output by the first selector circuit. The one of the subsets of bits is input to a respective second selector circuit in an initial one of two or more shift-and-select stages. In each of the two or more shift-and-select stages, an un-shifted version of the subset of bits is input to one of the inputs of the respective second selector circuit. A different shifted version of the subset of bits is input to one or more others of the up to m inputs of the respective second selector circuit. One of the un-shifted or different shifted versions of the subset of bits is selected for output by the respective second selector circuit. In each of the two or more shift-and-select stages other than the initial shift-and-select stage, the selected one of the versions of the subset of bits is input from a previous stage of the two or more shift-and-select stages. The selected one of the versions of the subset of bits that includes the field of data aligned to the least significant bit of the subset of bits is output from a last one of the two or more shift-and-select stages.

BRIEF DESCRIPTION OF THE DRAWINGS

Various aspects and advantages of the invention will become apparent upon review of the following detailed description and upon reference to the drawings, in which.

DETAILED DESCRIPTION

One or more embodiments provide a circuit for extracting fields from packets that is both configurable and resource-efficient. With an input field size and offset (in numbers of bits, for example), a field can be extracted from an arbitrary packet in a data stream. The number of resources needed to extract a field of a packet from a data stream and also align the field for output increases substantially when the bus width of the input data stream becomes large (e.g., >=1024 bits) due to the variability of where the field may reside in the input data stream.

In one embodiment a circuit is provided for selecting a field of data from a packet of data in an n-bit data path. The circuit includes a first selector circuit followed by two or more shift-and-select stages. The first circuit selects a subset of bits of the data path in which the field resides, and that subset of bits is provided as input to an initial one of the shift-and-select stages. The shift-and-select stages are coupled in a pipelined manner.

Each of the shift-and-select stages includes a respective second selector circuit. One of the inputs of the respective second selector circuit inputs an un-shifted version of the subset of bits, and one or more others of the inputs of the respective second selector circuit input different shifted versions of the subset of bits. Each respective second selector circuit outputs a selected one of the un-shifted or shifted versions of the subset of bits. The respective second selector circuit in a last one of the shift-and-select stages outputs one of the un-shifted or shifted versions of the subset of bits that includes the field of data aligned to the least significant bit.

Figure 1:
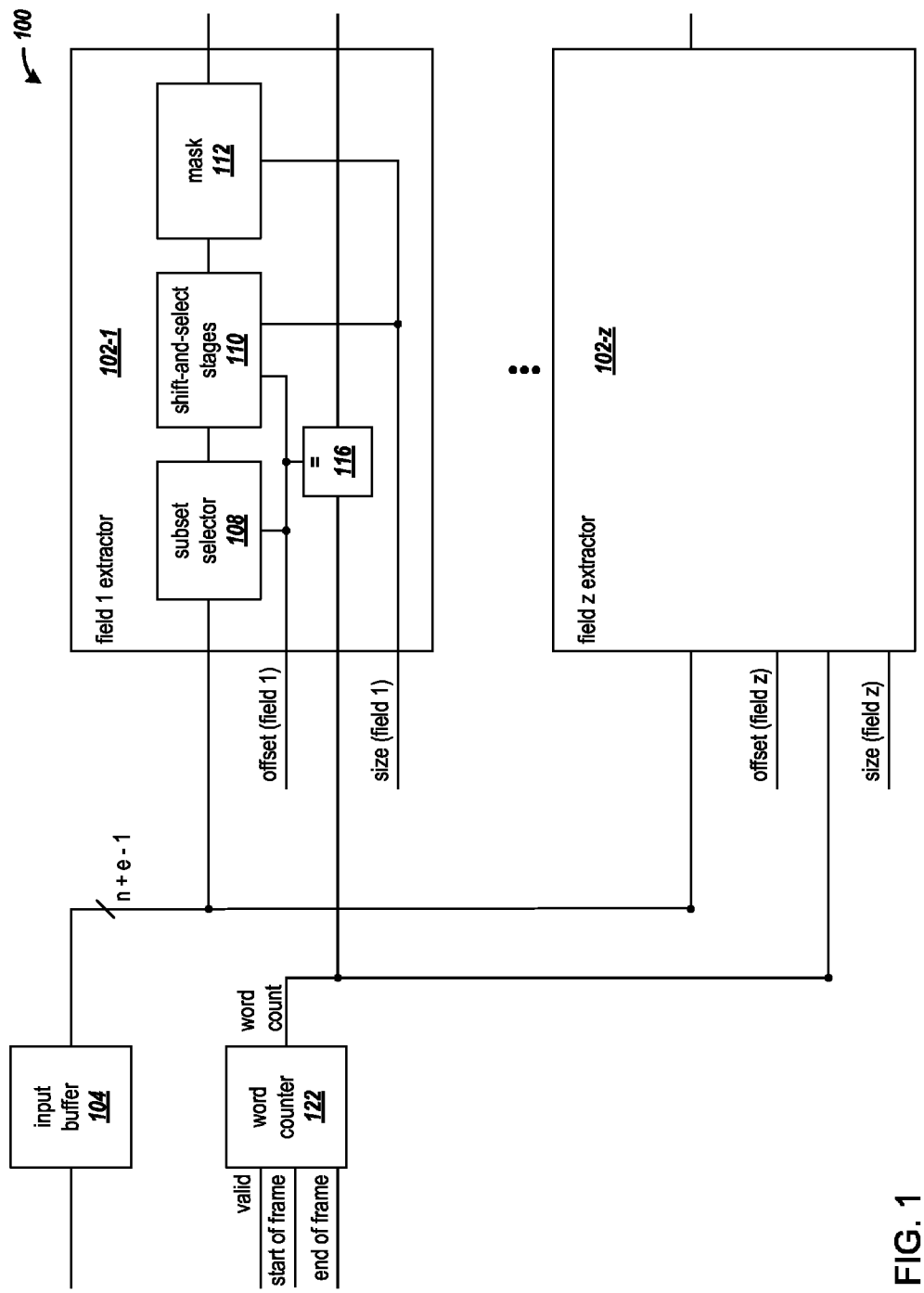
FIG. 1 is a diagram of a circuit arrangement for extracting fields of a packet from an input data path.

FIG. 1 is a diagram of a circuit arrangement 100 for extracting fields of a packet from an input data path. The circuit arrangement includes multiple field extractor circuits 102-1-102-z, each of which is tasked with extracting a field of an input packet. A packet is received in input buffer 104 and provided to the field extractor circuits concurrently so that the field extractor circuits may operate in parallel and output the extracted fields simultaneously. Each of the field extractor circuits also inputs values indicative of the offset and size of the respective field to be extracted. The offset indicates the position of the field relative to the input data stream. The offset and size may be values that indicate bits or bytes depending on implementation requirements. Though bits are used in the embodiments and examples described herein, it will be appreciated that the teachings herein may be readily adapted to byte-wise implementations.

In a system that accommodates different packet sizes, the size of a particular packet may not always align with the width of the input data path. Thus, if the width of the input data path provides one unit of data at a time (e.g., 1024 bits), a field of a particular packet may begin in one unit of data and end in the following unit of data (e.g., the next 1024 bits). In describing the embodiments, the data path is designated as being n bits wide. To accommodate fields that may span more than one unit of input data, a maximum field size, e, is configured, and n+e−1 bits are provided as input to each of the field extractor circuits 102-1-102-z. The maximum field size is the greatest field size possible for the different fields of the different packets that may be processed.

Each field extractor circuit includes, respectively, a subset selector circuit 108, two or more shift-and-select stages 110, and a mask circuit 112. The subset selector circuit 108 selects a subset of the input n+e−1 bits in which the field to extract is located. The selected subset is based on one or more of the higher order bits of the input offset value, for example.

The shift-and-select stages 110 receive the selected subset of bits from the subset selector circuit. Based on the offset value and the field size, the shift-and-select stages determine the location of the field to extract in the selected subset of bits. From stage to stage the shift-and-select stages select shifted versions of the subset based on the location. The output from the last stage in the shift-and-select stages contains the desired field that is right-aligned. The mask circuit 112 receives the right-aligned data from the shift-and-select stages 110 and masks the value using the input field size value.

The output signal from comparator circuit 116 indicates when the output from the mask circuit is a valid field. The word counter 122 counts the number of valid words that have been seen in the input data stream for each input packet. Packet boundaries are signaled by using the start of frame and end of frame inputs. A start of frame is signaled when the word in which a packet begins can be found at the input. An end of frame is signaled when the word in which a packet ends can be found at the input. The word count is reset to zero with a start of frame event. The word count is used by each field extraction unit 102-1 to 102-z to determine when the field to extract is available. The higher order bit(s) of the input offset are compared to the word count value to signal when the field is available. For example, if the input offset is for position 1096 (0b010001001000) with n=1024, then the field will be found in the second word of the packet. This is signaled by evaluating the comparison of word count==offset[12:11].

Figure 2:
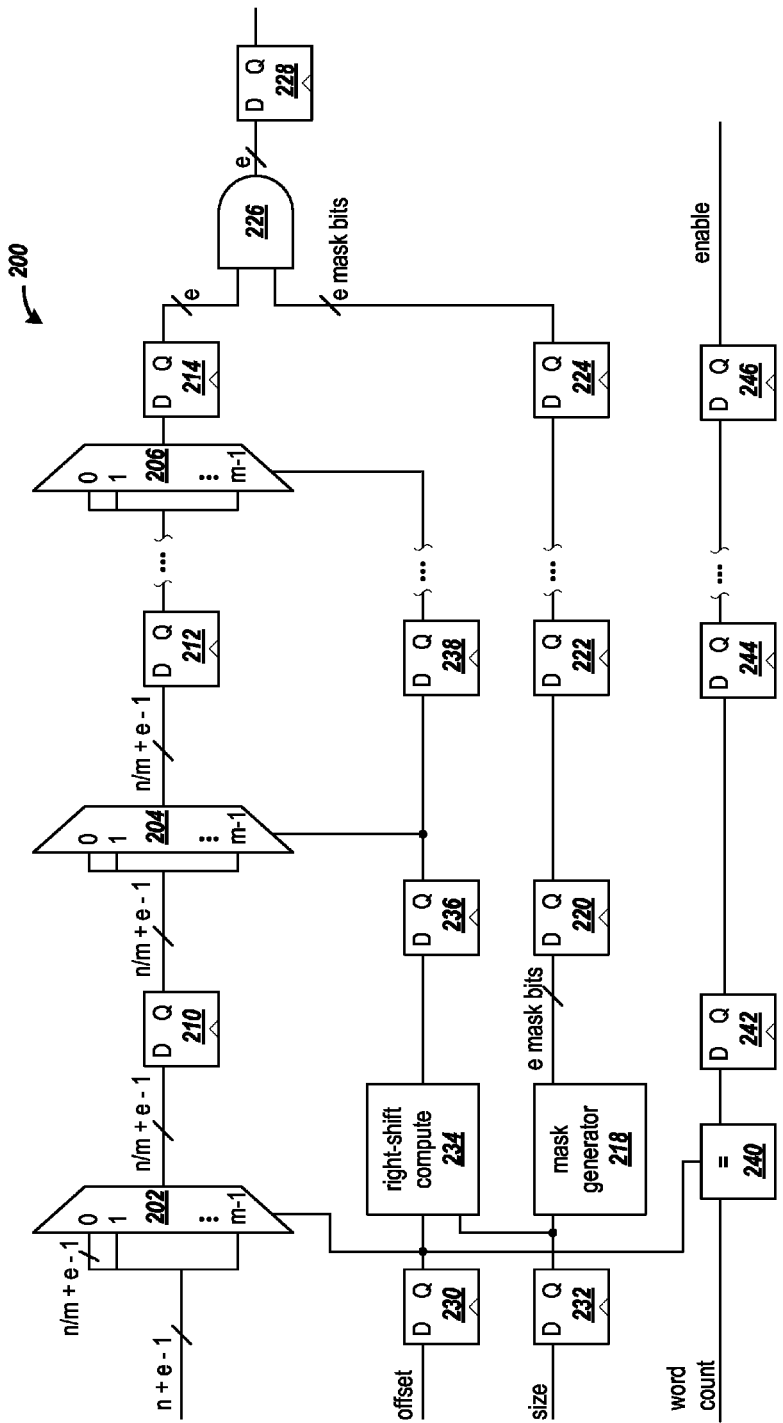
FIG. 2 is a diagram of a field extractor circuit according to one embodiment.

FIG. 2 is a diagram of a field extractor circuit 200 according to one embodiment. The field extractor circuit includes a first selector circuit 202, which corresponds to the subset selector circuit 108 of FIG. 1 and respective selector circuits 204-206 which correspond to the shift-and-select stages 110 of FIG. 1. Flip-flops 210 and 212-214 capture output from the selector circuits. Single flip-flops are shown for ease of illustration. However, it will be appreciated that multiple flip-flops would be used to capture the multiple bits of output. Mask generator circuit 218, flip-flops 220 and 222-224, and AND gate 226 correspond to the mask circuit 112 of FIG. 1. Output from AND gate 228 is captured by flip-flop 228 and is the extracted field.

The input field offset and field size values are captured in flip-flops 230 and 232, respectively. The right-shift compute circuit 234 determines the position of the desired field in the bits output by the selector circuit 202, and that value is passed along in flip-flops 236 and 238 for use in controlling the selector circuits 204-206. The word count is input to comparator circuit 240 along with the offset value, and the comparator circuit determines and signals when the word count equals the offset value. The signal value is propagated in flip-flops 242 and 244-246 to coincide with availability of data of the desired field in flip-flop 228.

For an n-bit data path, n+e−1 bits are input to the field extractor circuit 200, and different subsets of those n+e−1 bits are input to the m inputs of the first selector circuit 202. As described in reference to FIG. 1, e is the maximum field size that can be processed. Specifically, n/m+e−1 bits are input to each of the inputs of the selector circuit 202, and the subsets intersect or "overlap" by e−1 bits to allow for a field that spans two of the subsets. The higher order bits of the offset value are used to control the selection of one of the subsets of bits by the selector circuit 202. For example, if n=1024 and m=16 (number of inputs), then the 4 higher order bits ([9:6]) of the offset value may be used to select one of the 16 inputs.

The selected subset of n/m+e−1 bits is stored in flip-flop 210. Different right-shifted versions of the selected subset of bits are provided as inputs to the selector circuit 204, which is the initial or first of the shift-and-select stages. To the selector circuit in the initial stage, the different versions are shifted by one bit. One of the inputs receives an un-shifted version. For example, if n=1024, m=16, and e=32, then n/m+e−1=95 bits. One input receives bits [94:0], another input receives bits [94:1], another input receives bits [94:2], and so on. The inputs to the selector circuit in subsequent stages receive versions that are shifted by multiple bits as will be explained further below.

The selector circuit 204 selects one of the shifted versions in response to certain bits of the right-shift value computed by the right-shift compute circuit 234. The right-shift compute circuit computes the right-shift value as a function of lower order bits of the offset, the field size, and the value of n/m+e−1. Specifically, the right-shift value=n/m+e−1−offset [lower order bits]−size. For an example 10-bit offset value (to accommodate a data path width of 1024 bits), higher order bits [9:6] are used for selector circuit 202, and lower order bits [5:0] are used in computing the right shift value. From the right-shift value, the lower order $\log_2 m$ bits are used as the selection input to selector circuit 204.

Inputs to the stages other than the initial stage are versions of the selected subset of bits that are shifted by multiple bits as explained further below. Generally, the shift amount increases from one stage to the next, and within a stage, the shift amount is a multiple of $m^i$, where h is the number of stages and 0<=i<=h−1. Specifically, for inputs 0 through m−1 in stage 1, the shift amounts are 0 through m−1 (multiples of $m^0$), respectively; for inputs 0 through m−1 in stage 2, the shift amounts are 0, m, 2m, . . . (m−2)m, (m−1)m, respectively; for inputs 0 through m−1 in stage 3, the shift amounts are 0, $m^2$, $2m^2$, . . . $(m-2)m^2$, $(m-1)m^2$, respectively; and so on. It will be appreciated that smaller selector circuits having fewer inputs may be used in later stages since the shift amounts quickly outpace the subset of n/m+e−1 bits.

The selection of the subset of bits made by the selector circuits in stages following the initial stage uses higher order bits of the right-shift value. The number of higher order bits used from the right-shift value depends on the number of inputs from which the selection is made. Generally, for t inputs the high order $\log_2 t$ bits are used.

The output from the selector circuit 206 in the last shift-and-select stage is e bits that are right aligned. These bits are ANDed with the e-bit mask that is output by the mask generator circuit 218. For example, if e is 32 and the input size is 8, then the mask will be x000000ff.

For a particular implementation, the number of stages and the numbers of inputs to the selector stages may be selected based on the packet size, field size, input data path width, and available circuit resources.

The different shifted versions may be effectively provided to the inputs of the selector circuit by connecting the stored n/m+e−1 bits to the bit lines (individual ones not shown) of the selector circuit in a manner that accomplishes the shift. For example, if n/m+e−1 bits are stored and designated [MSB . . . LSB], to input a version of [MSB . . . LSB] that is shifted right by one bit, the LSB+1 bit is connected to the LSB input of the selector circuit, the LSB+2 bit is connected to the LSB+1 input, and so on; the stored LSB bit is not connected to any input of the selector circuit, except for the un-shifted input.

Figure 3:
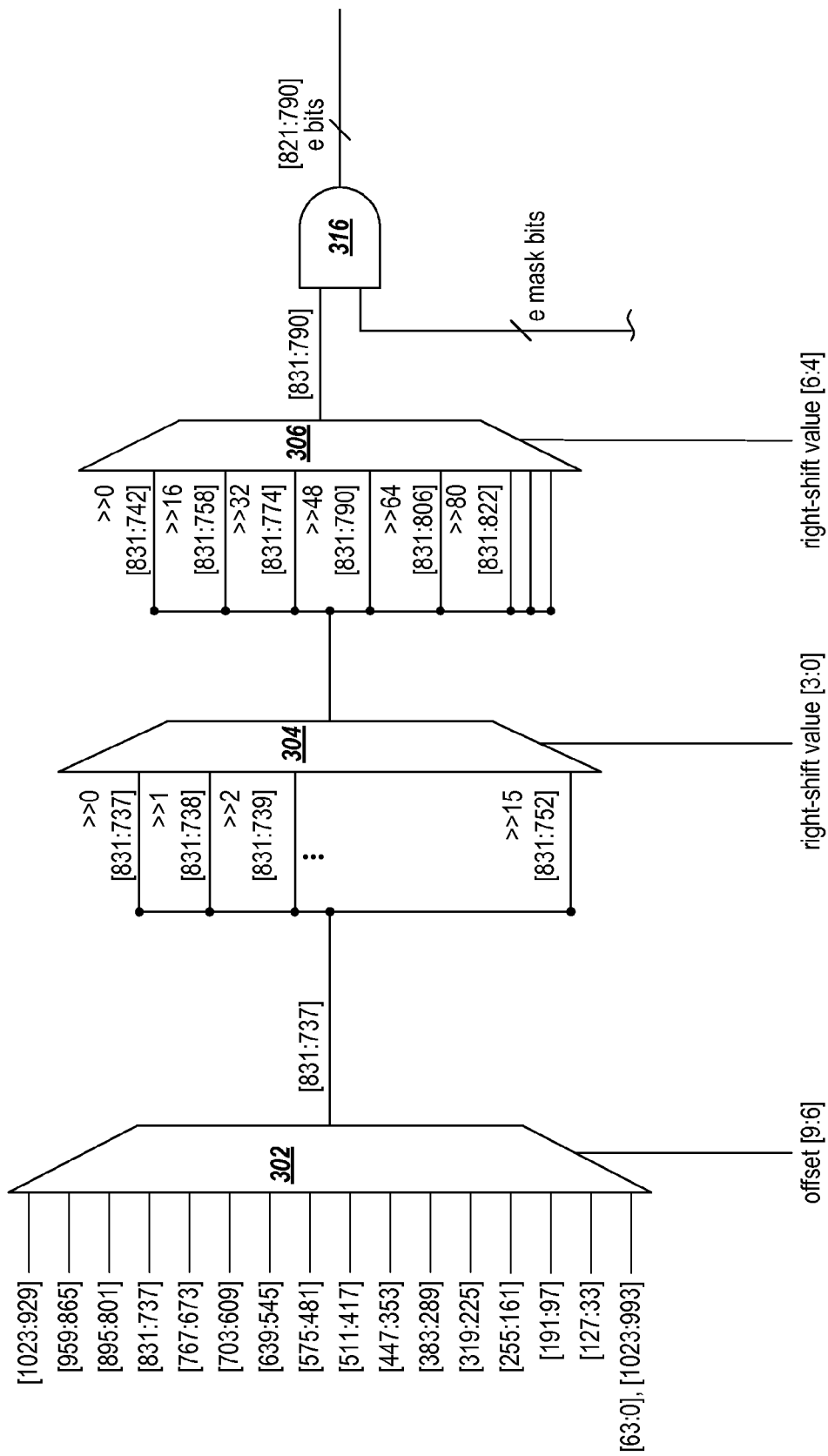
FIG. 3 is a diagram that shows the flow of data through the field extractor circuit for an example data path.

FIG. 3 is a diagram that shows the flow of data through the field extractor circuit for an example data path width n=1024 bits, a maximum field size e=32 bits, and the subset selector circuit 302 and the selector circuit 304 in the initial stage having m=16 inputs. The field to extract is in bits [821:790] of the input n+e−1 bits. Thus, the offset value is $202_{10}$ or 0b0011001010. Selector circuit 302 corresponds to selector circuit 202 of FIG. 2 and narrows the data path from n bits to (n/m+e−1) bits.

Overlapping subsets of the n+e−1 bits are provided to the inputs of the selector circuit 302. Each input receives a subset that includes n/m+e−1 bits of the input, and the subsets overlap by e−1 bits (31 bits) as shown. Bits [9:6] (i.e., 0011) of the offset value are used to select from input 3 the subset of input bits [831:737] that contains the desired field.

Different shifted versions of the selected [831:737] bits are provided to the inputs of selector circuit 304. The selected [831:737] bits are shifted by 0, 1, 2, 3 . . . 15 positions for the inputs to the first stage selector circuit 304. Thus, bits [831:737] are provided to input 0, bits [831:738] are provided to input 1, bits [831:739] are provided to input 2, . . . and bits [831:752] are provided to input 15.

The right-shift value is calculated as (n/m+e−1)−offset[5:0]−size as explained above. The computed right-shift value is used to control the selections by the selection circuits 304 and 306. The value of offset[5:0] is 0b001010 ($10_{10}$) and the value of size is 32, which in this example is equal to the maximum size, e. The computed right shift is (1024/16+32−1)−10−32=53, or 0b0110101. The lower 4 bits ([3:0]) of the right-shift value are used to control the selection by the selector circuit 304 in the initial stage. Since bits [3:0] are 0b0101, input 5 is selected, which is a version of bits [831:737] shifted by 5 bits. This results in bits [831:742] being output by selector circuit 304.

Different shifted versions of the selected [831:742] bits are provided to the inputs of selector circuit 306. The selected [831:742] bits are shifted by 0, 16, 32, 48, 64, and 80 positions for inputs 0-5, respectively, of the second stage selector circuit 306. Thus, bits [831:742] are provided to input 0, bits [831:758] are provided to input 1, bits [831:774] are provided to input 2, bits [831:790] are provided to input 3, bits [831:806] are provided to input 4, and bits [831:822] are provided to input 5.

Note that because of the example parameters, the final shifting stage does not require m (i.e., 16) inputs. Thus, a smaller selection circuit may be used. Unused inputs are tied to an unshifted version of the preceding data.

The higher order bits of the right-shift value are used to control the selection by selector circuit 306. In this example, 3 bits are needed to select from the 8 inputs of the selector circuit 306. Thus, bits [6:4], which are 0b011, results in the selection of input 3. The selected version is bits 831:742 shifted by 48 bits. Thus, bits [831:790] are output. When the 32-bit mask is applied to the output value at AND gate 316, the remaining data includes bits [821:790], which is the desired field. The final extracted field is aligned in the least significant bits in the output.

Figure 4:
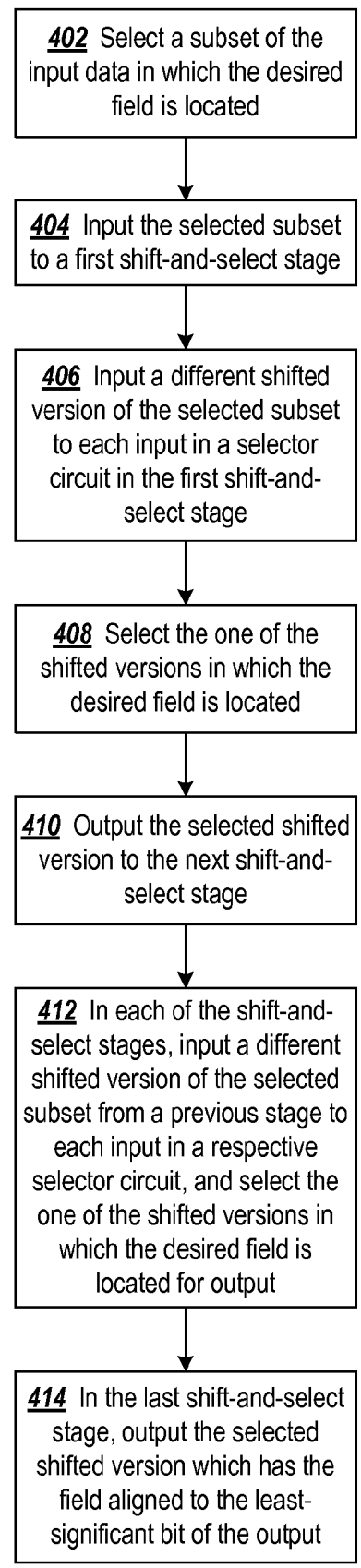
FIG. 4 is a flowchart of a method for extracting a field from a packet.

FIG. 4 is a flowchart of a method for extracting a field from a packet. At block 402, a subset of the input data in which the desired field is located is selected by a subset selector circuit. The subset selector circuit selects from overlapping subsets of the input data. The selected subset is provided to the selector circuit in a first shift-and-select stage at block 404. Each input of the selector circuit in the first shift-and-select stage inputs a different shifted version of the selected subset at block 406. At block 408, the selector circuit in the first shift-and-select stage selects the one of the shifted versions in which the desired field is located, and at block 410 outputs the selected shifted version to the next shift-and-select stage. In the subsequent one of the shift-and-select stages, at block 412 different shifted versions of the selected subset from a previous stage are input to the inputs of the respective selector circuit. The selector circuit selects the one of the shifted versions in which the desired field is located for output. The process continues in subsequent shift-and-select stages up to the last stage. At block 414, the selector circuit in the last shift-and-select stage, selects and outputs the shifted version which has the field aligned to the least-significant bit of the output.

Figure 5:
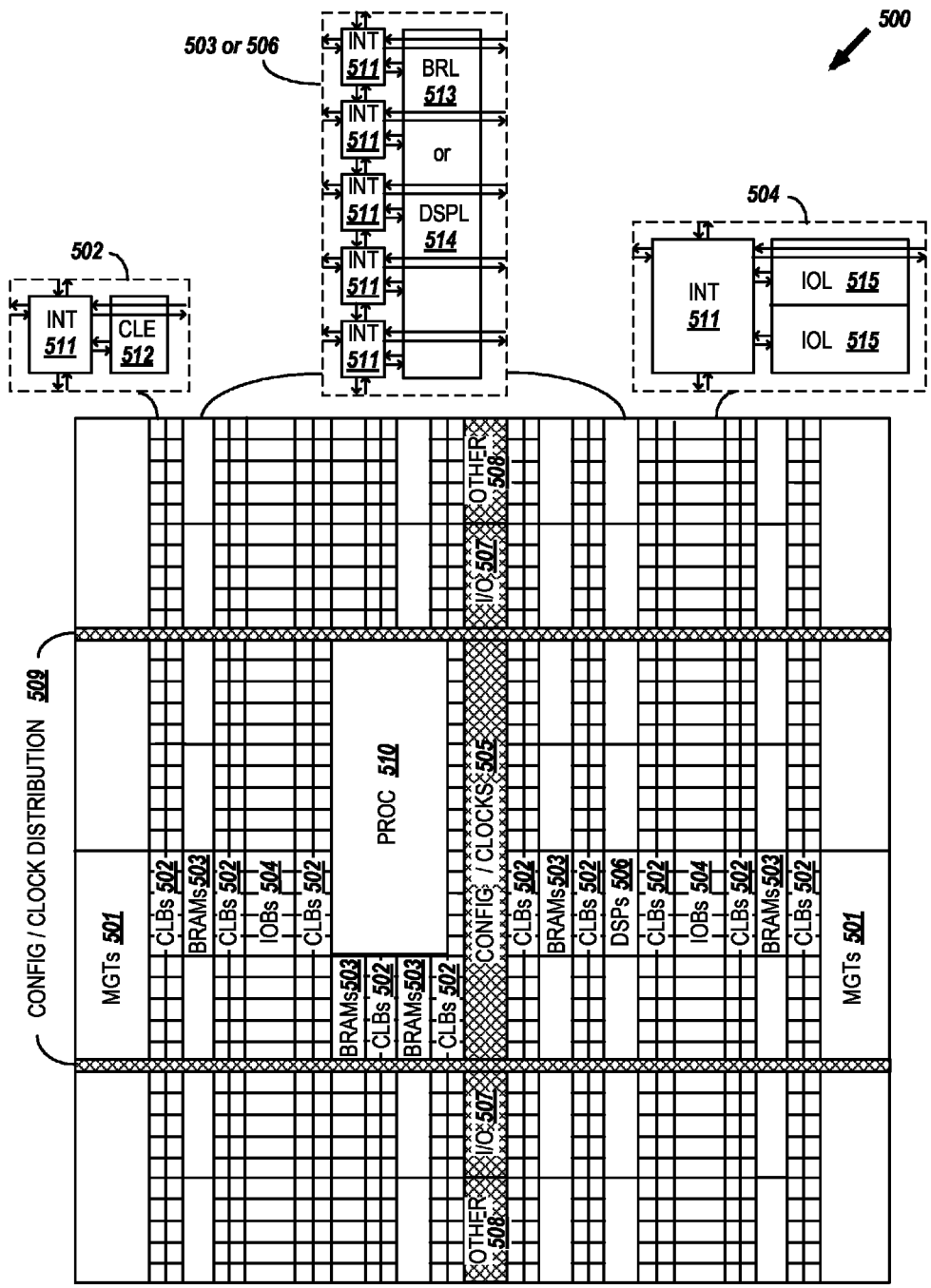
FIG. 5 is a block diagram of a programmable integrated circuit on which field extraction circuitry may be implemented in accordance with one or more embodiments of the invention.

FIG. 5 is a block diagram of a programmable integrated circuit on which field extraction circuitry may be implemented in accordance with one or more embodiments of the invention. Programmable integrated circuits can include several different types of programmable logic blocks in the array. For example, FIG. 5 illustrates an FPGA architecture 500 that includes a large number of different programmable tiles including multi-gigabit transceivers (MGTs) 501, configurable logic blocks (CLBs) 502, random access memory blocks (BRAMs) 503, input/output blocks (IOBs) 504, configuration and clocking logic (CONFIG/CLOCKS) 505, digital signal processing blocks (DSPs) 506, specialized input/output blocks (I/O) 507, for example, e.g., clock ports, and other programmable logic 508 such as digital clock managers, analog-to-digital converters, system monitoring logic, and so forth. Some FPGAs also include dedicated processor blocks (PROC) 510 and internal and external reconfiguration ports (not shown).

In some FPGAs, each programmable tile includes a programmable interconnect element (INT) 511 having standardized connections to and from a corresponding interconnect element in each adjacent tile. Therefore, the programmable interconnect elements taken together implement the programmable interconnect structure for the illustrated FPGA. The programmable interconnect element INT 511 also includes the connections to and from the programmable logic element within the same tile, as shown by the examples included at the top of FIG. 5.

For example, a CLB 502 can include a configurable logic element CLE 512 that can be programmed to implement user logic plus a single programmable interconnect element INT 511. A BRAM 503 can include a BRAM logic element (BRL) 513 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 506 can include a DSP logic element (DSPL) 514 in addition to an appropriate number of programmable interconnect elements. An 10B 504 can include, for example, two instances of an input/output logic element (IOL) 515 in addition to one instance of the programmable interconnect element INT 511. As will be clear to those of skill in the art, the actual I/O pads connected, for example, to the I/O logic element 515 are manufactured using metal layered above the various illustrated logic blocks, and typically are not confined to the area of the input/output logic element 515.

In the pictured embodiment, a columnar area near the center of the die (shown shaded in FIG. 5) is used for configuration, clock, and other control logic. Horizontal areas 509 extending from this column are used to distribute the clocks and configuration signals across the breadth of the FPGA.

Some FPGAs utilizing the architecture illustrated in FIG. 5 include additional logic blocks that disrupt the regular columnar structure making up a large part of the FPGA. The additional logic blocks can be programmable blocks and/or dedicated logic. For example, the processor block PROC 510 shown in FIG. 5 spans several columns of CLBs and BRAMs.

Note that FIG. 5 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 5 are purely exemplary. For example, in an actual FPGA more than one adjacent column of CLBs is typically included wherever the CLBs appear, to facilitate the efficient implementation of user logic.

The embodiments of the present invention are thought to be applicable to a variety of packet processors. Other aspects and embodiments will be apparent to those skilled in the art from consideration of the specification. The embodiments may be implemented as one or more processors configured to execute software, as an application specific integrated circuit (ASIC), or as a logic on a programmable logic device. It is intended that the specification and illustrated embodiments be considered as examples only, with a true scope of the invention being indicated by the following claims.

What is claimed is:

1. A circuit for selecting a field of data from a packet of data in an n-bit data path, comprising:
   a first selector circuit having m inputs and an output, wherein each of the m inputs receives a respective subset of bits of the data path, the respective subset of bits input to each of the m inputs overlaps with the respective subset of bits of the data path input to another of the m inputs, and the first selector circuit selects one of the subsets of bits for the output; and
   two or more shift-and-select stages, each shift-and-select stage including a respective second selector circuit having up to m inputs and an output, the inputs of an initial one of the shift-and-select stages coupled to the output of the first selector circuit, and the respective second selector circuit in each other of the two or more shift-and-select stages coupled to the output of the respective second selector circuit in a preceding one of the shift-and-select stages, wherein:
   one of the inputs of the respective second selector circuit inputs an un-shifted version of the subset of bits, one or more others of the up to m inputs of the respective second selector circuit input different shifted versions of the subset of bits, and the respective second selector circuit outputs a selected one of the un-shifted or shifted versions of the subset of bits; and
   the respective second selector circuit in a last one of the shift-and-select stages outputs one of the un-shifted or shifted versions of the subset of bits that includes the field of data aligned to the least significant bit.

2. The circuit of claim 1, further comprising a mask circuit configured and arranged with an input for receiving a value indicative of a field size and further configured and arranged to mask output from the respective second selector circuit in the last one of the shift-and-select stages.

3. The circuit of claim 1, wherein the different shifted versions of the subset of bits are right-shifted versions.

4. The circuit of claim 1, wherein the first selector circuit is further configured and arranged to select the one of the subsets of bits responsive to an input value indicative of an offset of the field in the n-bit data path.

5. The circuit of claim 1, wherein the different shifted versions of the subset of bits at the inputs of the respective second selector circuit in the initial one of the shift-and-select stages are versions shifted by multiples of one bit.

6. The circuit of claim 5, wherein the different shifted versions of the subset of bits at the inputs of the respective second selector circuit in each of the shift-and-select stages other than the initial shift-and-select stage are versions shifted by multiple bits.

7. The circuit of claim 1, wherein:
the first selector circuit, for a maximum field size of e, each of the m inputs receives n/m+e−1 bits of the data path, respectively, and the respective n/m+e−1 bits input to each of the m inputs overlap with the respective n/m+e−1 bits of the data path input to another of the m inputs; and
the one or more others of the up to m inputs of the respective second selector circuit input different shifted versions of the n/m+e−1 bits, and the respective second selector circuit outputs a selected one of the un-shifted or shifted versions of the n/m+e−1 bits.

8. The circuit of claim 1, wherein:
the two or more shift-and-select stages include h stages; and
the different shifted versions of the subset of bits at the inputs of the respective second selector circuit in each stage i of the shift-and-select stages, for 0<=i<=h−1, are versions shifted by $m^i$ bits.

9. A circuit for selecting fields of data from a packet of data in an n-bit data path, comprising:
a plurality of field extractor circuits configured and arranged for parallel input of bits of the data path, wherein each field extractor circuit includes, respectively:
a first selector circuit having m inputs and an output, wherein each of the m inputs receives a respective subset of bits of the data path, the respective subset of bits input to each of the m inputs overlaps with the respective subset of bits of the data path input to another of the m inputs, and the first selector circuit selects one of the subsets of bits for the output; and
two or more shift-and-select stages, each shift-and-select stage including a respective second selector circuit having up to m inputs and an output, the inputs of an initial one of the shift-and-select stages coupled to the output of the first selector circuit, and the respective second selector circuit in each other of the two or more shift-and-select stages coupled to the output of the respective second selector circuit in a preceding one of the shift-and-select stages, wherein:
one of the inputs of the respective second selector circuit inputs an un-shifted version of the subset of bits, one or more others of the up to m inputs of the respective second selector circuit input different shifted versions of the subset of bits, and the respective second selector circuit outputs a selected one of the un-shifted or shifted versions of the subset of bits; and
the respective second selector circuit in a last one of the shift-and-select stages outputs one of the un-shifted or shifted versions of the subset of bits that includes the field of data aligned to the least significant bit.

10. The circuit of claim 9, wherein each field extractor circuit further includes, respectively, a mask circuit configured and arranged with an input for receiving a value indicative of a field size and configured and arranged to mask output from the respective second selector circuit in the last one of the shift-and-select stages.

11. The circuit of claim 9, wherein the different shifted versions of the subset of bits are right-shifted versions.

12. The circuit of claim 9, wherein the first selector circuit is further configured and arranged to select the one of the subsets of bits responsive to an input value indicative of an offset of the field in the n-bit data path.

13. The circuit of claim 9, wherein the different shifted versions of the subset of bits at the inputs of the respective second selector circuit in the initial one of the shift-and-select stages are versions shifted by multiples of one bit.

14. The circuit of claim 13, wherein the different shifted versions of the subset of bits at the inputs of the respective second selector circuit in each of the shift-and-select stages other than the initial shift-and-select stage are versions shifted by multiple bits.

15. A method for selecting a field of data from a packet of data in an n-bit data path, comprising:
inputting a respective subset of bits of the data path to each of m inputs of a first selector circuit, wherein the respective subset of bits input to each of the m inputs overlaps with the respective subset of bits of the data path input to another of the m inputs;
selecting one of the subsets of bits for output by the first selector circuit;
inputting the one of the subsets of bits to a respective second selector circuit in an initial one of two or more shift-and-select stages;
in each of the two or more shift-and-select stages:
inputting an un-shifted version of the subset of bits to one of the inputs of the respective second selector circuit;
inputting a different shifted version of the subset of bits to one or more others of the up to m inputs of the respective second selector circuit; and
selecting one of the un-shifted or different shifted versions of the subset of bits for output by the respective second selector circuit;
in each of the two or more shift-and-select stages other than the initial shift-and-select stage, inputting the selected one of the versions of the subset of bits from a previous stage of the two or more shift-and-select stages; and
outputting from a last one of the two or more shift-and-select stages the selected one of the versions of the subset of bits that includes the field of data aligned to the least significant bit of the subset of bits.

16. The method of claim 15, further comprising:
inputting a value indicative of a field size; and
masking output from the last one of the shift-and-select stages.

17. The method of claim 15, wherein the different shifted versions of the subset of bits are right-shifted versions.

18. The method of claim 15, further comprising:
inputting a value indicative of an offset of the field in the n-bit data path;
wherein the selecting of the one of the subsets of bits for output by the first selector circuit is in response to the value of the offset.

19. The method of claim 15, wherein the different shifted versions of the subset of bits at the inputs of the respective second selector circuit in the initial one of the shift-and-select stages are versions shifted by multiples of one bit.

20. The method of claim 15, wherein the different shifted versions of the subset of bits input to the respective second selector circuit in each of the shift-and-select stages other than the initial shift-and-select stage are versions shifted by multiple bits.

* * * * *